Nov. 22, 1949 G. L. CHERRY ET AL 2,488,581
APPARATUS FOR MOLDING STEPPED CYLINDRICAL ARTICLES
Filed March 8, 1945 2 Sheets-Sheet 1
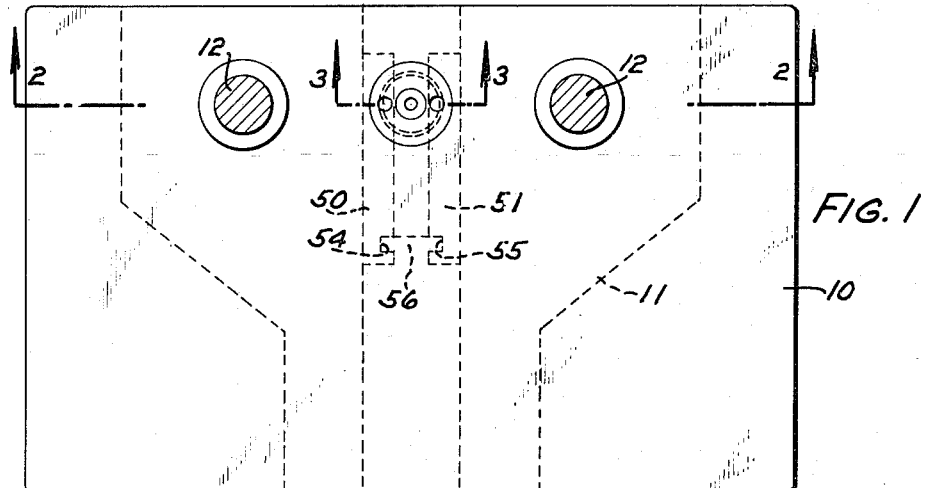
FIG. 1
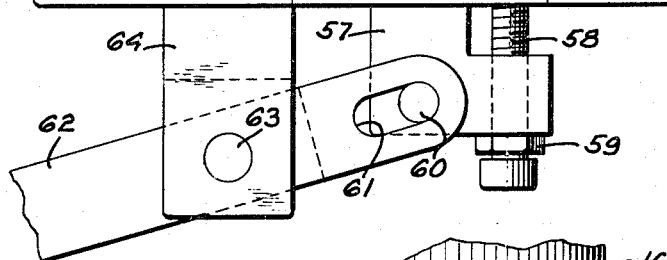
FIG. 2
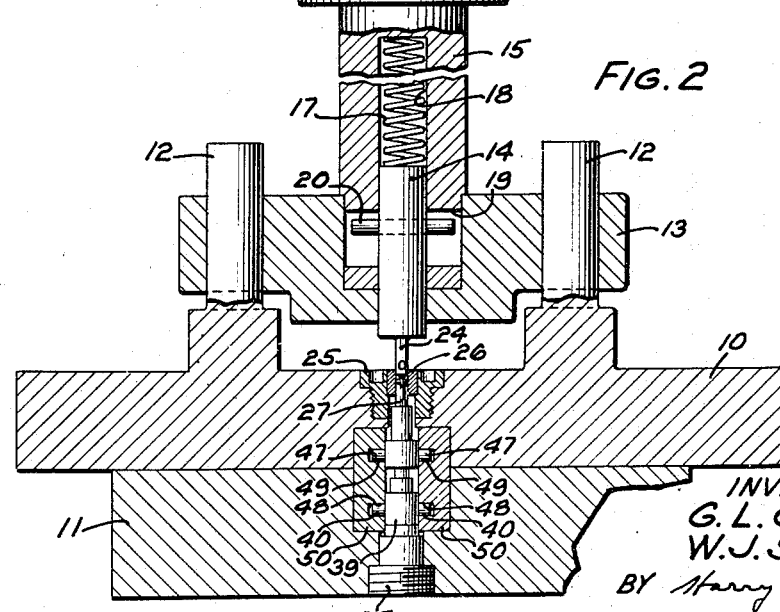
INVENTORS
G. L. CHERRY
W. J. SCOTT
BY Harry L. Duft
ATTORNEY

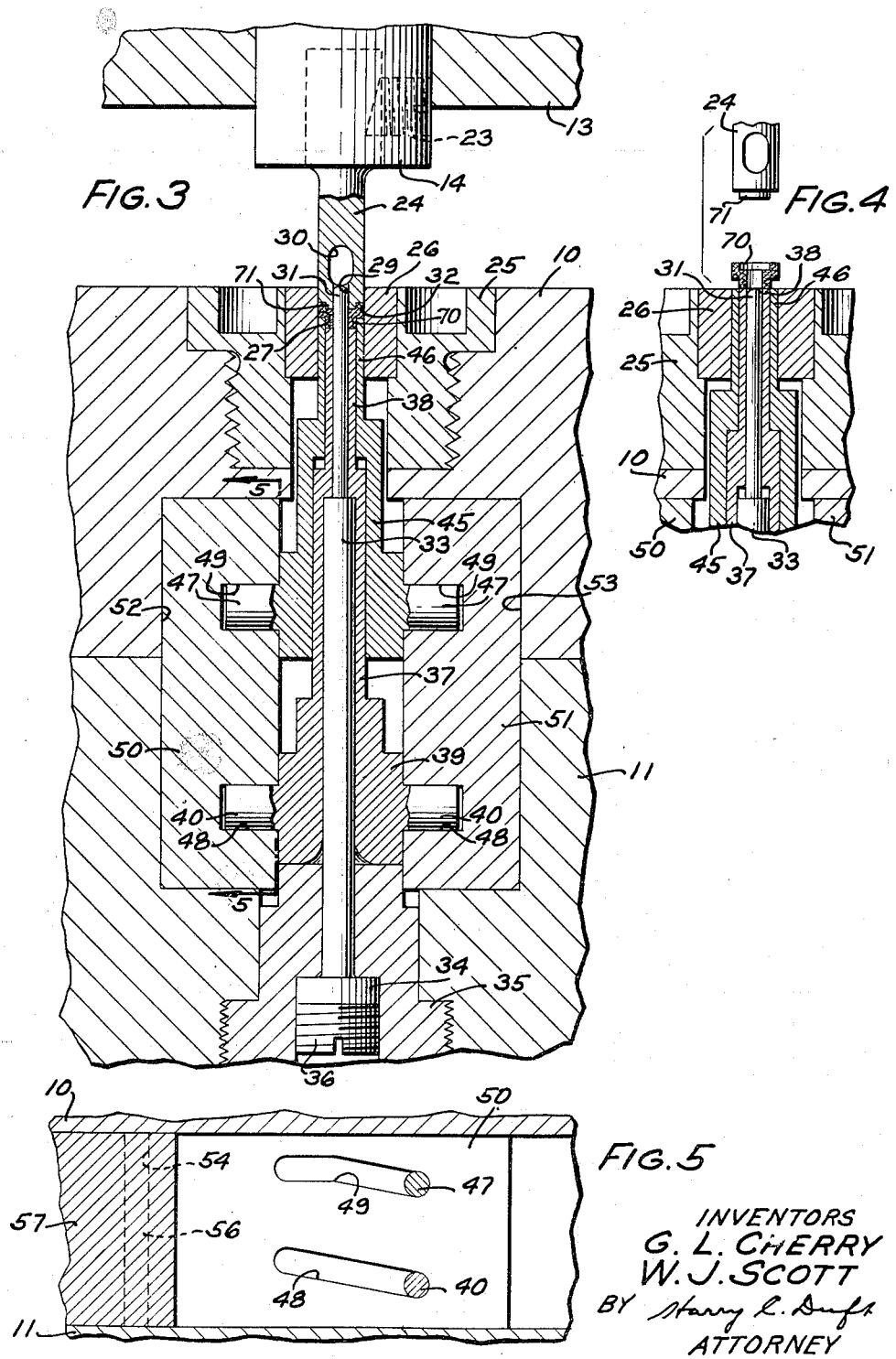

Patented Nov. 22, 1949

2,488,581

UNITED STATES PATENT OFFICE 2,488,581

APPARATUS FOR MOLDING STEPPED CYLINDRICAL ARTICLES

George L. Cherry, Western Springs, and Walter J. Scott, Hinsdale, Ill., assignors to Western Electric Company, Incorporated, New York, N. Y., a corporation of New York Application March 8, 1945, Serial No. 581,642

4 Claims. (Cl. 25—83)

This invention relates to molding apparatus and more particularly to a press for molding ceramic parts before firing them.

It is an object of the present invention to provide a simple and effective molding press.

In accordance with one embodiment of the invention, an apparatus is provided for molding annular ceramic insulators wherein the periphery of the mold cavity comprises a stationary member in which two relatively slidable concentric sleeves are slidably positioned to comprise two levels of the base of the die cavity and a stationary pin extends through the inner sleeve to enter an upper molding die and form the central aperture in the ceramic part. The two concentric sleeves are supported in molding position by cams, which may be actuated simultaneously to first move both sleeves in unison, thereby to free the molded part from the peripheral wall of the mold cavity and to then move the inner sleeve with respect to the outer sleeve to strip the molded part from the outer sleeve and stationary pin.

A complete understanding of the invention may be had by reference to the following detailed description when considered in conjunction with the accompanying drawings, wherein Fig. 1 is a plan sectional view through a molding press comprising one embodiment of the invention and showing the lower portions of the press in the position which they occupy when the press is ready to be operated;

Fig. 2 is a front view of the press, partly in section, the sectional portion being taken along the line 2—2 of Fig. 1 and showing the upper molding die in its operated position;

Fig. 3 is an enlarged fragmentary sectional view, taken substantially along the line 3—3 of Fig. 1 in the direction of the arrows showing the details of the molding die parts on a much enlarged scale and also showing these parts in the position which they occupy during the molding operation;

Fig. 4 is a fragmentary sectional view similar to the upper portion of Fig. 3, but showing the die parts in the position which they occupy when the molded part has been ejected; and Fig. 5 is a fragmentary sectional view taken substantially along the line 5—5 of Fig. 3 in the direction of the arrows showing one of the cams which serves to actuate the concentric sleeves comprising the base of the die cavity.

Referring to the drawings, wherein like reference characters designate the same parts throughout the several views, particular reference being first had to Figs. 1 and 2, wherein a die supporting plate 10 is shown mounted upon a suitable base member 11, the die supporting plate 10 carrying a pair of liner pins 12—12, which serve to hold a guide plate 13 in position to guide a molding plunger 14 during its reciprocation to effect a molding operation. The guide plate 13 is fixed to the lower end of a piston rod 15, which extends into a hydraulic cylinder 16 and may be actuated by fluid fed into the cylinder 16, as is usual in molding presses of the general character covered herein. The molding plunger 14 is slidably mounted in the piston rod 15 and is normally urged downwardly by a compression spring 17 interposed between the upper end of the plunger 14 and the end of a bore 18 formed in the piston rod 15. The lower end of the piston rod extends into the guide plate 13 and has a cross slot 19 formed in it to receive a pin 20, which extends through the molding plunger 14 and limits the reciprocation of the plunger with respect to the piston rod 15.

The die supporting plate 10 has a die holder 25 threaded into it for supporting a die member 26 concentrically with respect to the path of movement of an upper molding die 24 fixed to the plunger 14 by means of a set screw 23. The die member 26 is annular in configuration, having a central aperture 27 of sufficient diameter to receive the upper molding die 24 carried by the molding plunger 14. The upper molding die 24 has a central bore 29 formed in it (Fig. 3), which terminates in a radially disposed perforation 30 extending across the die. The bore 29 is adapted to receive the upper end of a molding pin 31, constituting a die core pin, which defines the inner diameter of a mold cavity 32, the outer diameter of which is defined by the die member 26. The molding pin 31 comprises the reduced shank of a pin 33 having a head 34, which is, in turn, held in a plug 35 threaded into the base member 11, the pin 33 being held in the plug 35 by a set screw 36. The pin 33 and integrally formed molding pin 31 are, therefore, held stationary at all times, as is the die member 26.

Normally resting upon the upper end of the plug 35 and encircling the pin 33 is a sleeve member 37 having formed integrally with it an upper inner molding sleeve 38, which surrounds and engages the molding pin 31. The sleeve 37 has a lower enlarged portion 39, from which there extend a pair of cam pins 40—40, whereby reciprocation can be imparted to the sleeve 37. Surrounding the sleeve 37 and slidable with respect thereto is a second sleeve 45 having formed integrally therewith an outer molding sleeve 46, which encircles the inner molding sleeve 38 and fills the space between it and the inner surface of the die member 26. The sleeve 45 is equipped with cam pins 47—47, similar to the cam pins 40, which serve to impart reciprocation to the sleeve 45. The cam pins 40—40 and 47—47 extend into cam slots 48—48 and 49—49, respectively, formed in a pair of cam members 50 and 51, which are slidable in ways 52 and 53, respectively, formed by cooperating surfaces of the die supporting plate 10 and base member 11.

By reference to Fig. 1, it will be seen that the cam members 50 and 51 are provided with notches 54 and 55, respectively, adapted to receive the ends of a T-shaped projection 56 formed on a cam actuator 57, which is also slidable in the ways 52 and 53. The cam actuator 57 has an abutment screw 58 threaded into it and locked in position by a lock nut 59 to limit the movement of the actuator toward the axis of the dies, and the actuator is provided with a pin 60, which extends into a slot 61 in a manually operable lever 62. The lever 62 is pivoted at 63 on a bracket 64 attached to the die supporting plate 10 in any suitable manner.

In molding a ceramic part or blank 70 (Fig. 4), which serves as an insulator in electrical apparatus and, after being formed, is fired, an annular shoulder 71 on the lower end of the upper molding die 24 cooperates with the inner molding sleeve 38 and outer molding sleeve 46, as well as the lower surface of the main body of the upper molding die 24 and the die member 26 to define the mold cavity 32, as shown most clearly in Fig. 3. In preparing to mold a part 70, the upper molding die 24 is retracted to its uppermost position by the piston rod 15 operating under control of fluid in the cylinder 16 to the position shown in Fig. 4 and the manually operable lever 62 is moved to the position shown in Fig. 1, thus to move the sleeves 38 and 46 to the position shown most clearly in Fig. 3. With the apparatus in this condition, a supply of ceramic material may be placed in the die member 26 surrounding the molding pin 31 and fluid may be admitted to the upper end of the cylinder 16 to cause the piston rod 15 to move downwardly. When the piston rod 15 moves downwardly to the position shown in Figs. 2 and 3, the molding plunger 14 will be pressed down against the material in the die cavity 32 to compress and pack the material. The amount of pressure exerted by the piston rod 15 on the molding plunger 14 will be controlled by the spring 17, which tends to move the plunger 14 downwardly with the piston rod 15. A measured quantity of moldable ceramic material having been placed in the die cavity 32, the molding plunger 13 will carry the molding die 24 down to compress the ceramic material and form it to the shape of the die cavity 32. The shape of the part 70 is such that it would be very difficult to strip it from the die cavity without damaging the part and, according to the present invention, the part is stripped from the dies by manually operating the lever 62 to move the cam actuator 57 outwardly. When the cam actuator 57 is moved outwardly, it will move the cam members 50 and 51 with it and the surfaces of the cam slots 48 and 49 will, through pins 40 and 47, first move the sleeves 37 and 46 upwardly in unison until the upper end of the sleeve 46 is flush with the upper surface of the die member 26. When the sleeve 46 reaches the position where its upper end is flush with the upper surface of the die member 26, its movement will be halted due to the formation of the cam slots 49, whereas the sleeve 38 will continue to move upwardly due to the construction of the cam slots 48 and will strip the part 70 from the core pin or molding pin 31 and from the inner surface of the sleeve 46. When the two sleeves 38 and 46 have reached their uppermost position, as shown in Fig. 4, the part 70 will be completely stripped from the die and will be resting only on the upper end of the sleeve 38 in position for easy removal from the press, whereupon another cycle of the press may be initiated.

What is claimed is:

1. A ceramic molding apparatus comprising a stationary die member having a bore forming a part of a mold cavity, a stationary core pin in the bore of the stationary die member, a reciprocable die member arranged to enter the upper portion of the bore of said stationary die member and having a recess for receiving said core pin, a pair of relatively movable telescopingly arranged sleeves in the lower portion of the bore of said stationary die member and surrounding the core pin to form a two-step base of said mold cavity, cam members extending from said sleeves, normally stationary cams cooperating with said cam members for holding the sleeves stationary during the molding operation, and means for actuating said cams to impart movement to said sleeves for first moving said sleeves in unison for a predetermined distance to partially eject a molded part from the mold cavity and for then moving one of the sleeves relative to the other to completely eject the molded part from the mold cavity.

2. A molding apparatus comprising a stationary die member having a cylindrical aperture therein forming a portion of a die cavity, a stationary core pin disposed within the aperture of said stationary die member, a pair of relatively movable normally stationary telescoping sleeves disposed within the die aperture and surrounding the core pin to form a stepped base for the die aperture, a reciprocable die member having a central bore arranged to receive said stationary core pin, said reciprocable die member being receivable in the die aperture for compressing moldable material therein in cooperation with the stationary die member, the core pin and the telescoping sleeves to define said die cavity, cam members extending from said sleeves, an actuating member movable relative to said sleeves, and cams associated with said actuating members and having portions thereof cooperating with said cam members for holding the sleeves stationary during the molding operation, said cams having parallel portions for moving said sleeves as a unit until the top of one of said sleeves is flush with the top of the die aperture whereby the molded part will be supported and moved by both sleeves to a partly ejected position, said cams also having converging portions operable for holding said one sleeve at its advanced position and for moving said other sleeve until the top thereof is flush with the top of said die aperture whereby said part will be moved to its fully ejected position.

3. A molding apparatus comprising a stationary die member having a die aperture therein, a pair of movable normally stationary plungers disposed within the lower portion of the die aperture and with the upper ends thereof arranged at different levels, a reciprocable die member arranged to enter the die aperture to compress moldable material therein, cam members extending from said plungers, a normally stationary cam element having cam surfaces engageable with said cam members for holding the plungers stationary during the molding operation, and means for actuating said cam element to impart movement to said plungers first to raise the plungers in unison until the upper end of one of the plungers is level with the upper end of said stationary die and then to hold said one plunger stationary and raise the other plunger until the end thereof is level with the end of said one plunger.

4. A molding apparatus comprising a stationary die member having a die aperture therein, a pair of relatively movable normally stationary telescoping members disposed within the die aperture to provide a stepped base therefor, a reciprocatory die member receivable in the die aperture to compress moldable material therein and in cooperation with the stationary die and the telescoping members to form a die cavity, cam members extending from the telescoping members, an element movable relative to the cam members, and cam surfaces on said element engaging said cam members for holding the telescoping members stationary during the molding operation, said cam surfaces having portions in parallel relation to each other for moving the telescoping members in unison to a predetermined position where the molded part is partly disengaged from the die aperture and said cam surfaces having portions in convergent relation to each other for moving one of the telescoping members relative to the other to disengage fully the molded part from the die aperture.

GEORGE L. CHERRY.
WALTER J. SCOTT.

REFERENCES CITED

The following references are of record in the file of this patent:

UNITED STATES PATENTS

| Number | Name | Date |
|---|---|---|
| 2,325,687 | Kux | Aug. 3, 1943 |
| 2,350,971 | Pecker et al. | June 6, 1944 |